United States Patent [19]

Pine

[11] Patent Number: 5,033,900
[45] Date of Patent: Jul. 23, 1991

[54] PIVOTING LINK SUBASSEMBLY
[75] Inventor: James J. Pine, Tupelo, Miss.
[73] Assignee: DBJU, Inc., Verona, Miss.
[21] Appl. No.: 572,612
[22] Filed: Aug. 27, 1990
[51] Int. Cl.⁵ .......................................... F16C 11/06
[52] U.S. Cl. .................... 403/162; 403/161; 403/146
[58] Field of Search ............ 403/161, 162, 163, 146, 403/145

[56]         References Cited
        U.S. PATENT DOCUMENTS

| | | |
|---|---|---|
| 1,814,703 | 7/1931 | Johnson . |
| 1,934,780 | 11/1933 | Van Halteren . |
| 2,441,552 | 5/1948 | Barnes .............................. 403/162 X |
| 2,696,018 | 12/1954 | Hollister . |
| 3,304,830 | 2/1967 | Shackelford . |
| 3,561,792 | 2/1971 | Cycowicz ........................ 403/162 X |
| 3,842,710 | 10/1974 | Poupitch . |
| 4,202,243 | 5/1980 | Leonhardt . |

FOREIGN PATENT DOCUMENTS 1014131  5/1952  France ............................. 403/161

Primary Examiner—Andrew V. Kundrat
Attorney, Agent, or Firm—Watson, Cole, Grindle & Watson

[57]        ABSTRACT

A pivoting link subassembly of a linkage support system includes a first link having a circular bore hole therein, a second link having a non-circular bore hole therein, a washer positioned between the links so as to be aligned with an axis extending through the aligned bore holes, and a rivet which extends through the bore holes to maintain the links together and provide a pivot, the rivet including a shank portion which fills the non-circular bore hole in the second link to assure rotational connection thereto.

4 Claims, 1 Drawing Sheet

U.S. Patent
July 23, 1991
5,033,900
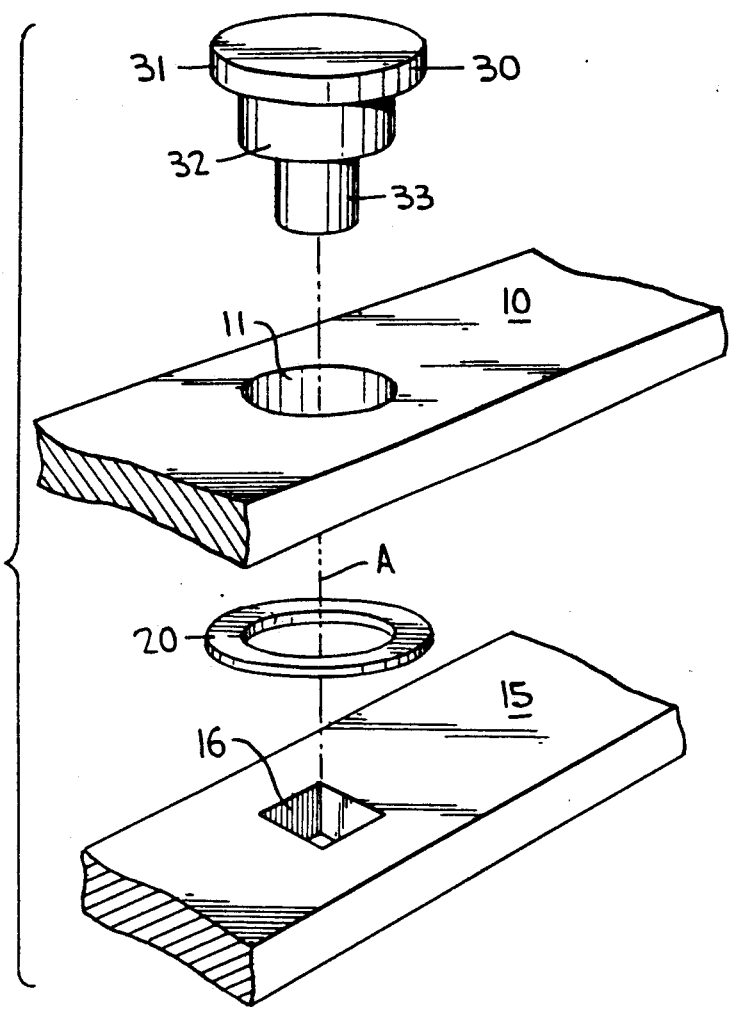
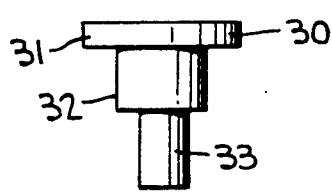
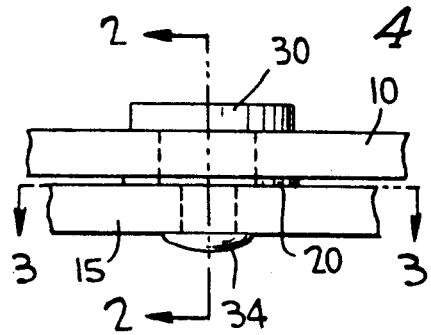
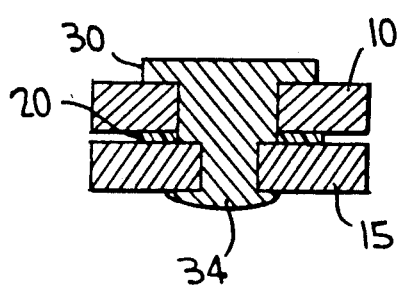
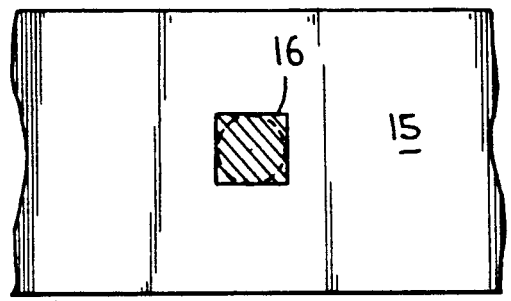

PIVOTING LINK SUBASSEMBLY

FIELD OF THE INVENTION

The present invention relates to linkage support systems, and more particularly to the pivoting link subassemblies which are found in virtually all linkage support systems.

THE PRIOR ART

Linkage support systems are utilized in many different mechanical devices and are commonly employed as movable supports in reclining chairs (see, for example, U.S. Pat. No. 4,895,411), for extending and retracting convertible tops of automobiles, for extensible lamps, etc. Such linkage support systems contain pivoting link subassemblies composed of two links and a rivet connecting them together, the rivet acting as a pivot such that at least one of the links can be rotated or pivoted relative to the other. Often times the two links have holes therein at their opposite ends for connection to other links or frame elements of the linkage support system, while the rivet extends through aligned rivet holes located inwardly of their ends.

Conventionally used rivets have a head, a first shank portion of larger diameter and a second shank portion of smaller diameter, whereas the two links have circular rivet holes therein having diameters which are slightly larger than the diameters of the corresponding rivet shank portions which extend therethrough. During assembly the rivet is passed through the respective rivet holes in the links and the second shank portion of the rivet which extends beyond the link which is remote from the head of the rivet (hereinafter called the remote link) is treated so that it will expand to fill the rivet hole in the remote link and also form a flange or locking tail portion, thereby pivotally connecting the links together.

However, if the treatment of the second shank portion of the rivet is not properly conducted, or as a result of extensive use (relative pivoting of the links), the second shank portion of the rivet is or becomes loose within the rivet hole in the remote link (such that it will not rotate with the remote link), it may become tilted relative to the rivet hole axis, causing a binding of the links when rotation is attempted. Over time, complete failure of the pivoting link subassembly, and thus the entire linkage support system, can occur, resulting in the need for an inconvenient and expensive replacement of parts.

SUMMARY OF THE INVENTION

It is an object of the present invention to provide a pivoting link subassembly for use in a linkage support system which includes two links and a rivet which pivotally connects the links together and wherein the rivet can be permanently connected to the link remote from the head of the rivet, such that failure of the subassembly (and the linkage support system of which it is a part) due to loosening of the rivet within the remote link can be avoided.

According to the invention, the link remote from the head of the rivet is provided with a non-circular bore hole, such that when the pivoting link subassembly is constructed and the shank portion of the rivet near its tip is caused to fill the non-circular bore hole, this shank portion of the rivet will also have a non-circular cross section. In this way, the rivet and the remote link will never rotate relative to one another to cause wear on the rivet and ultimate non-alignment of the rivet in the rivet hole of the remote link.

A further understanding of the invention will be achieved by reference to the accompanying drawings, taken in conjunction with the following discussion.

BRIEF DESCRIPTION OF THE DRAWINGS

In the drawings,

FIG. 1 is a side view of a portion of a pivoting link subassembly according to one embodiment of the present invention, FIG. 2 is a cross-sectional view of the subassembly as seen along line 2—2 of FIG. 1, FIG. 3 is a view of one of the links of the subassembly as seen along line 3—3 of FIG. 1, FIG. 4 is an exploded view of the elements of the subassembly of FIG. 1 prior to permanent connection, and FIG. 5 is a side elevational view of the rivet used in the subassembly.

DETAILED DESCRIPTION OF THE PREFERRED EMBODIMENT

As indicated in FIGS. 1-5, the inventive pivoting link subassembly includes first and second links 10 and 15, a washer 20 and a rivet 30. As best seen in FIG. 4, the first link 10 has a circular bore hole 11 therethrough and the second link 15 has a square bore hole 16 therethrough. The rivet 30 includes a head 31, a first cylindrical shank port 32 having a diameter and length so as to extend through and beyond the bore hole 11 in the first link, and a second cylindrical shank portion 33 having a diameter and length so as to extend through and beyond the bore hole 16 in the second link. The diameter of the second cylindrical shank portion 33 is less than that of the first shank portion 32. The washer 20, which has an inner diameter that is larger than the diameter of the first cylindrical shank portion 32, is positioned between the first and second links so as to be aligned with an axis A that extends through the aligned bore holes 11 and 16 and so that the first cylindrical shank portion of the rivet 30 can extend at least partially therethrough when the elements are connected together. The washer 20 is preferably made of plastic.

When constructing the inventive pivoting link subassembly, the rivet 30 can be extended through the bore hole 11, the washer 20 and the bore hole 16, and the tip of the second cylindrical shank portion of the rivet is subjected to cold heading such that the second shank portion 33 will flow out of a cylindrical shape and fill in the open areas of the square bore hole 16 and thereafter provide a locking tail 34. The locking tail 34, together with head 31, will permanently connect the links together, while the washer 20 and the length of the first cylindrical shank portion 32 will enable one of the links to rotate relative to the other (if stationary), or both links to rotate relative to each other, about axis A. Due to the reshaping of the second cylindrical shank portion so as to completely fill the square bore hole 16, i.e., so as to have a square cross section, the rivet 30 will be lockingly and permanently attached to the second link 15 and will always rotate in unison therewith. Failure of the rivet connection due to relative rotation of the smaller (second) shank portion of the rivet and the remote link will be thereby avoided.

Although a preferred embodiment of the invention has been shown and described, changes therein can be made and still fall within the scope of the appended claims. For example, the bore hole in the (second) link remote from the head of the rivet need not be square in cross section but can be any non-circular cross-section, such as rectangular, oval or triangular.

I claim:

1. A pivoting link subassembly for use in a linkage support system which comprises:
    a first link having a cylindrical bore hole therethrough,
    a second link having a non-cylindrical bore hole therethrough,
    a washer positioned between said links so as to space said first and second links and so as to be aligned with said cylindrical bore hole and said non-cylindrical bore hole, and
    a rivet which pivotally connects said first and second links, said rivet having a head, a first cylindrical shank portion which extends through the cylindrical bore hole in said first link and at least partially through said washer, a second shank portion which extends through the non-circular bore hole in said second link and fills the non-circular bore therein, and a locking tail which, together with the head, maintains said first and second link arms together.

2. A pivoting link subassembly according to claim 1, wherein said non-circular bore hole is square.

3. A pivoting link subassembly according to claim 1, wherein said washer is made of plastic.

4. A method of making a pivoting link subassembly which comprises the steps of
    (a) providing a first link having a circular bore hole therethrough,
    (b) providing a second pivoting link having a non-circular bore hole therethrough,
    (c) providing a washer,
    (d) providing a rivet having a head, a first cylindrical shank portion having a diameter which enables it to extend through said circular bore hole in said first link and said washer, and a second cylindrical shank portion having a diameter which enables it to extend through and beyond said non-circular bore hole in said second link,
    (e) positioning said first and second links, said washer and said rivet such that said first cylindrical shank portion of said rivet extends through said circular bore in said first link and at least through a portion of said washer, and said second cylindrical shank portion extends through and beyond said non-circular bore hole in said second link, and
    (f) cold heading said second cylindrical shank portion such that it completely fills said non-circular bore hole and provides a locking tail at a free end thereof, causing said head and said locking tail to maintain said first and second links together yet spaced by said washer and said rivet to become rotationally locked with said second link.

* * * * *